INVENTORS
WILFRED P. BAZINET, JR.
BY HENRY B. COLE

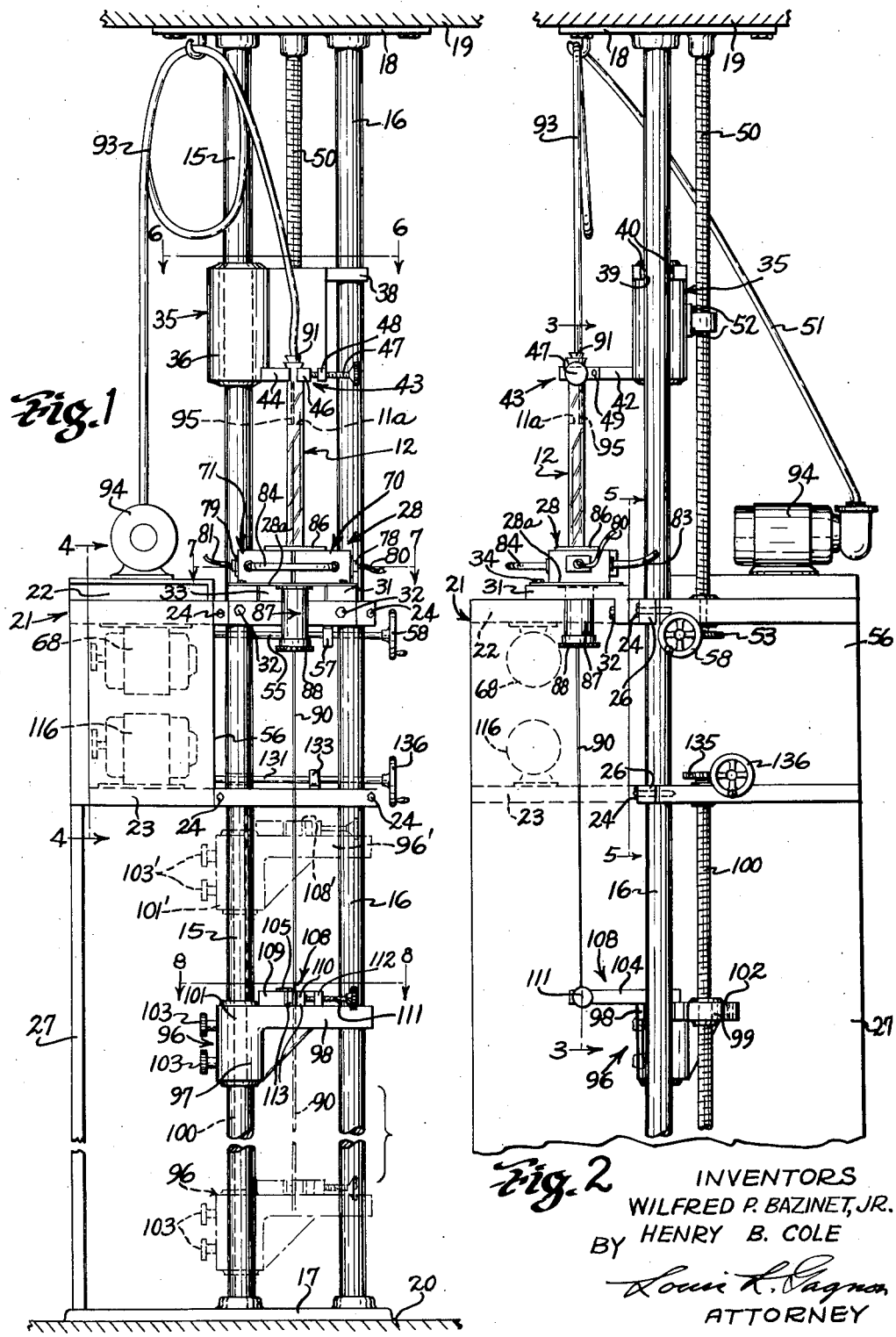
June 5, 1962    W. P. BAZINET, JR., ET AL    3,037,241
METHOD AND APPARATUS FOR MANUFACTURING
LIGHT-CONDUCTING DEVICES
Filed Dec. 24, 1959    7 Sheets-Sheet 1
INVENTORS
WILFRED P. BAZINET, JR.
HENRY B. COLE
BY
ATTORNEY June 5, 1962 W. P. BAZINET, JR., ET AL 3,037,241
METHOD AND APPARATUS FOR MANUFACTURING
LIGHT-CONDUCTING DEVICES
Filed Dec. 24, 1959 7 Sheets-Sheet 2
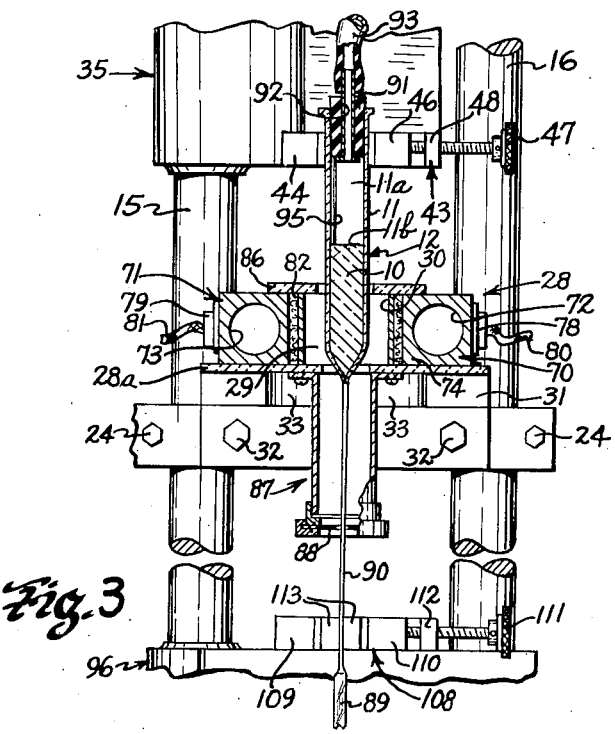
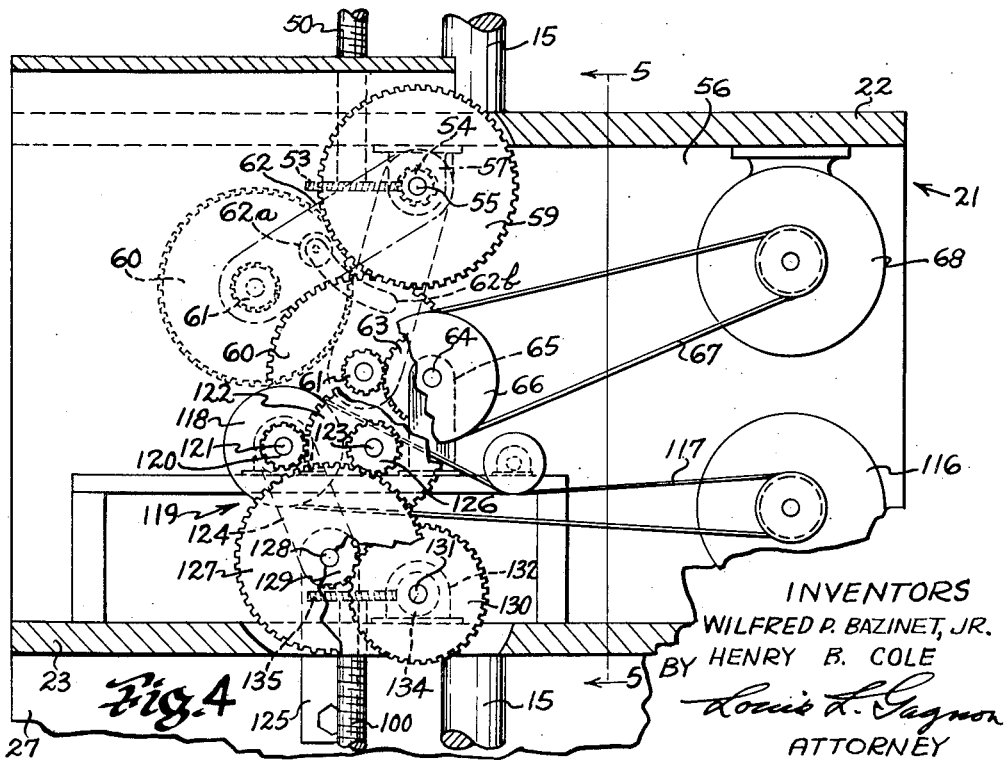
INVENTORS
WILFRED P. BAZINET, JR.
BY HENRY B. COLE
Louis L. Gagnon
ATTORNEY

ATTORNEY

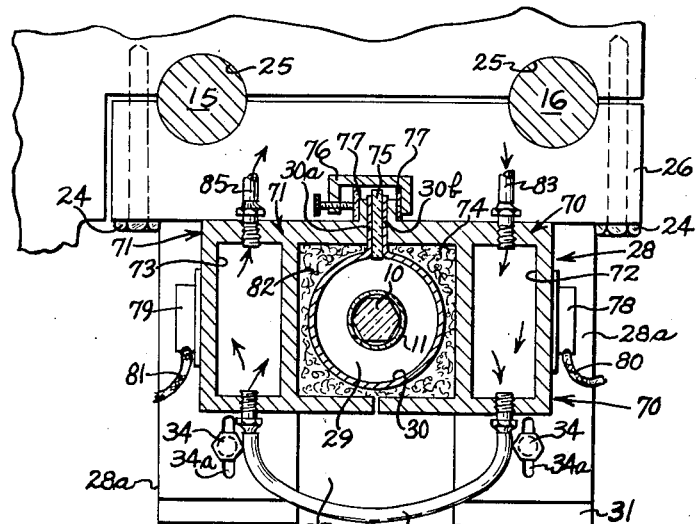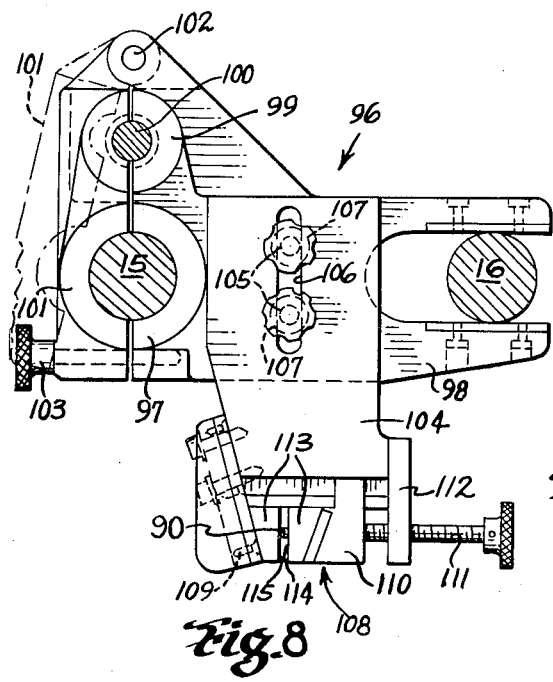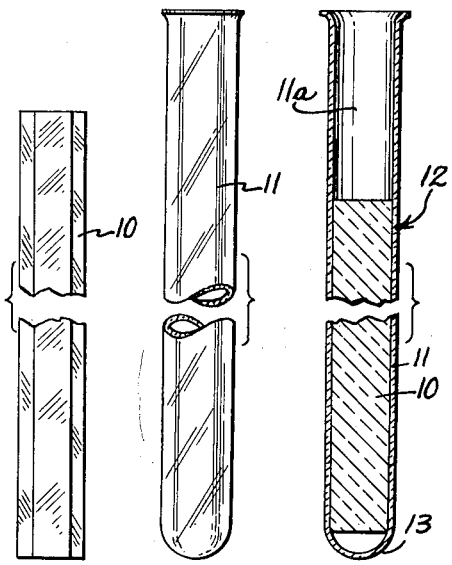

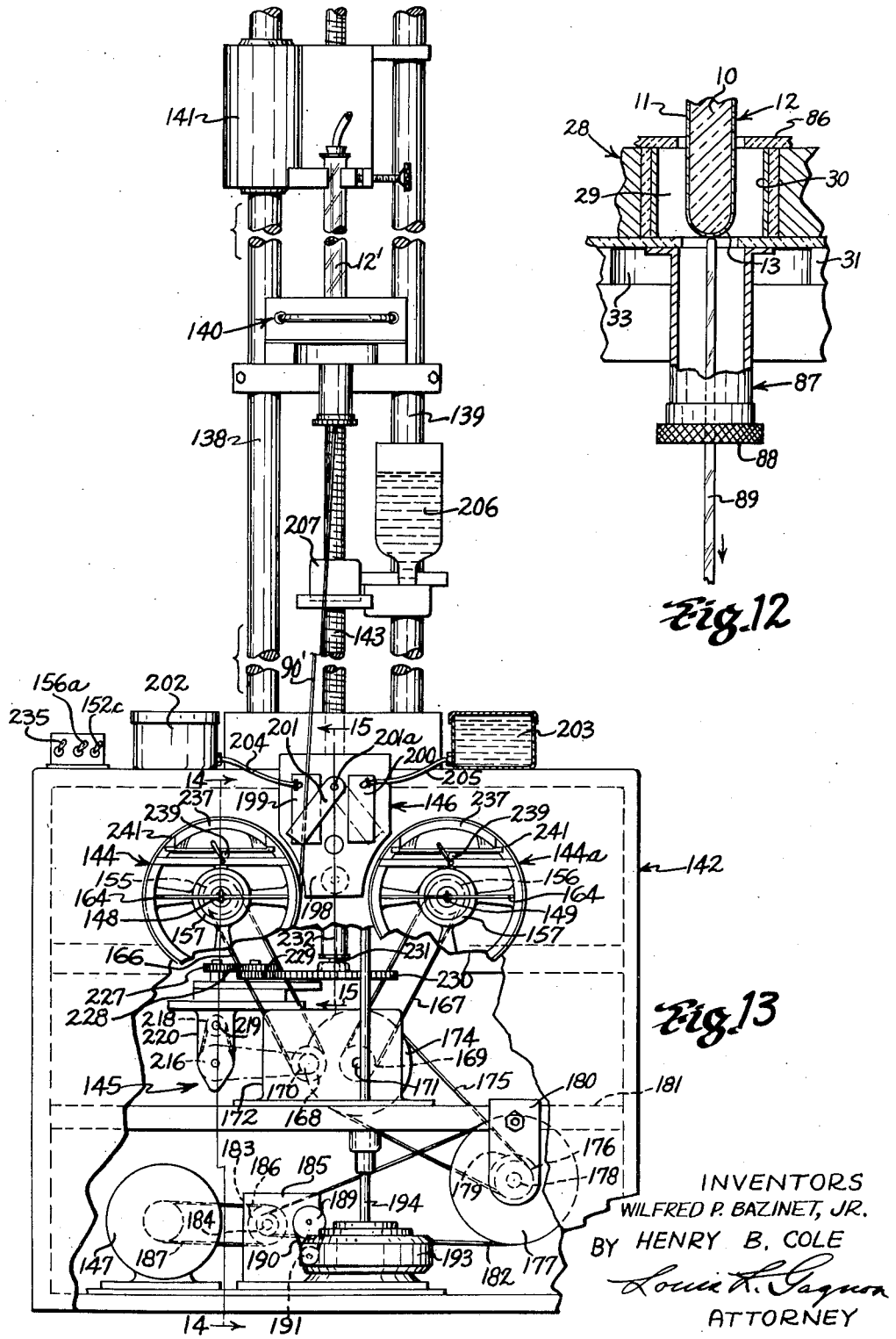

June 5, 1962 W. P. BAZINET, JR., ET AL 3,037,241
METHOD AND APPARATUS FOR MANUFACTURING
LIGHT-CONDUCTING DEVICES
Filed Dec. 24, 1959 7 Sheets-Sheet 7

INVENTORS
WILFRED P. BAZINET, JR.
BY HENRY B. COLE

ATTORNEY

United States Patent Office 3,037,241
Patented June 5, 1962

3,037,241
METHOD AND APPARATUS FOR MANUFACTURING LIGHT-CONDUCTING DEVICES
Wilfred P. Bazinet, Jr., Webster, Mass., and Henry B. Cole, East Woodstock, Conn., assignors to American Optical Company, Southbridge, Mass., a voluntary association of Massachusetts
Filed Dec. 24, 1959, Ser. No. 861,984
12 Claims. (Cl. 18—8)

This invention relates to an improved method of manufacturing clad light-conducting fibers or filaments of light-conducting material and to novel apparatus for carrying out said method.

Fiber-like light-conducting devices in their simplest form may consist of a single rod or filament of light-conducting material through which light entering one end of the filament will, because of internal reflection, be transferred through the filament to its opposite end. However, when two glass filaments or fibers come within a distance of approximately a half wave length of light from each other, some light will leak from one fiber to another and if an array of several intimately grouped or bundled fibers is formed to produce a fiber optical light-transferring device, this leakage of light, often referred to as "cross talk," becomes a serious problem particularly if the device is used to transfer optical images. It has, therefore, been a practice to insulate the fibers from one another by providing a jacket or cladding around each fiber to assure that a substantially complete internal reflection of light takes place within each fiber regardless of their proximity. In addition to obviating "cross talk" the jacketing or cladding protects the wall of the fiber keeping it clean and smooth so that maximum internal reflection takes place.

In general, the use of a transparent cladding material similar to the material of the core part of a fiber (but of a lower index of refraction) will produce the best results and while various different light-conducting materials other than glass have been used to form clad light-conducting fibers, it is quite well-known that fibers formed of optical glasses are superior. This is due, in part, to the fact that optical glasses have high internal homogeneity and an inherent ability to wet each other at precontrolled temperatures so as to form a tight bond between the core and cladding parts of clad fibers formed therefrom.

The manufacturing of glass fibers having glass cladding, however, has presented many problems, particularly those of consistently maintaining uniform desired thicknesses of cladding and core parts and a smooth, clean interface between said cladding and core parts of extended lengths of fibers. In view of these difficulties and others which will be discussed hereinafter, the mass production of high quality glass clad glass fibers has been difficult to perform economically and the use of devices formed of high quality clad light-conducting fibers has been seriously restricted and even, in some instances, economically prohibitive.

It will become apparent hereinafter that the present invention offers simple, efficient and economical means and method for producing superior light-conducting fibers of the above-mentioned clad type.

Accordingly, one of the principal objects of the invention is to provide novel method and apparatus for efficiently and economically producing light-conducting fibers or filaments having core parts of heat-softenable light-conducting glass of a preselected high index of refraction and integrally formed outer surrounding layers or claddings of glass of a preselected low index of refraction.

Another object is to provide improved and relatively simple means and method for manufacturing light-conducting fibers having glass core and glass cladding parts which are of substantially uniform precontrolled thicknesses and shapes throughout their lengths and wherein a substantially perfect uninterrupted interfacial fusion is obtained between said core and cladding parts.

Another object is to provide means and method for manufacturing a light-conducting fiber of the above character from an assembly consisting of a rod-like member of material of the type desired of the core part of said fiber placed within a tubular member of material of the type desired of the cladding part of said fiber wherein the related cross-sectional dimensions of said rod and tube are precontrolled according to their related dimensions desired in the ultimate fiber formed therefrom.

A further object is to provide improved and simplified apparatus and method for drawing a fiber or filament longitudinally from one end of an assembly of the above character wherein the parts of said assembly are held securely in interfitted relation with each other and heated sufficiently to render the materials thereof fusible to each other and suitably viscous for fiber drawing purposes without substantially altering the proportionate thicknesses of said materials during the drawing of said fiber.

A still further object is to provide, in a fiber drawing process of the above character, means and method for progressively collapsing the tubular member of said assembly onto the rod-like member during the drawing of the fiber while simultaneously outgassing the space between said members to provide a clean and smooth interface along the adjoining walls of the fiber core and cladding parts where internal reflection of light takes place when the ultimate fiber is put to use.

Other objects and advantages of the invention will become apparent from the following description when taken in conjunction with the accompanying drawings in which:

FIG. 1 is a front elevational view of a preferred form of apparatus for carrying out the method of the invention;

FIG. 2 is a fragmentary side elevational view of the apparatus illustrated in FIG. 1;

FIG. 3 is an enlarged fragmentary cross-sectional view taken substantially along line 3—3 of FIG. 2 looking in the direction of the arrows;

FIG. 4 is an enlarged fragmentary cross-sectional view taken substantially along line 4—4 of FIG. 1 looking in the direction of the arrows;

FIG. 7 is also an enlarged transverse cross-sectional view taken on line 7—7 of FIG. 1 looking in the direction of the arrows;

FIG. 8 is still another enlarged transverse cross-sectional view taken on line 8—8 of FIG. 1 looking in the directions of the arrows;

FIG. 9 is a side elevational view, partly in section, of one glass element used in the forming of a glass assembly from which fibers are drawn with the apparatus of the invention;

FIG. 10 is a side elevational view of another glass element of said assembly;

FIG. 11 is a vertical cross-sectional view of the above-mentioned glass assembly;

FIG. 12 is a fragmentary vertical cross-sectional view similar to FIG. 3 but illustrating an early step in the drawing of a fiber from a glass assembly such as shown in FIG. 11;

FIG. 13 is a front elevational view of a modified form of apparatus for manufacturing light-conducting fibers in accordance with the invention;

Figure 14:
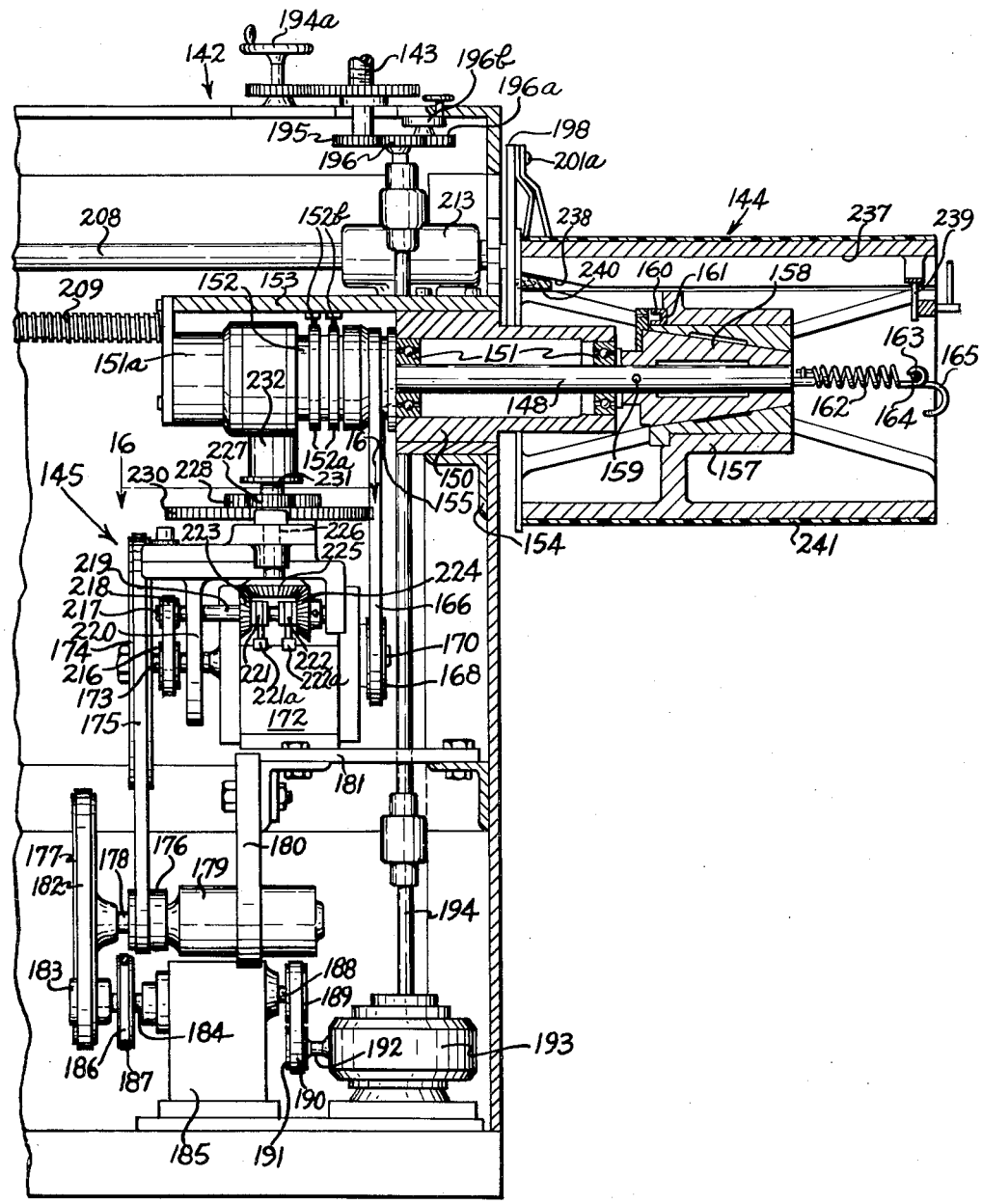
FIG. 14 is an enlarged vertical cross-sectional view taken substantially along line 14—14 of FIG. 13 looking in the direction of the arrows.
Figure 15:
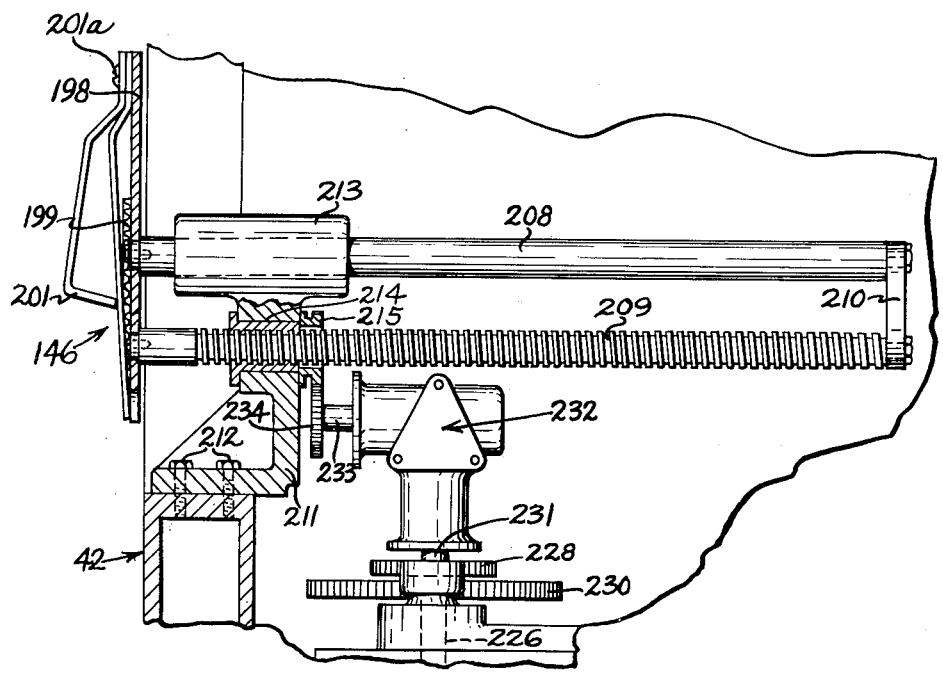
FIG. 15 is also an enlarged vertical cross-sectional view taken on line 15—15 of FIG. 13.
Figure 16:
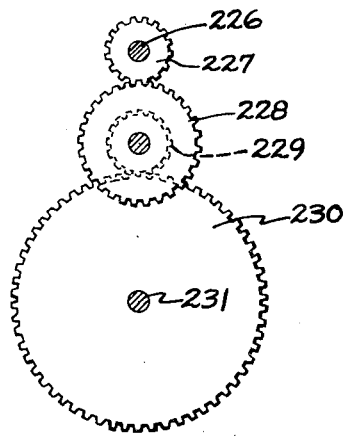
FIG. 16 is a cross-sectional view taken on line 16—16 of FIG. 14 looking in the direction of the arrows.

Referring more particularly to the drawings wherein like characters of reference designate like parts throughout the various views, there is illustrated in FIGS. 1–8 one form of apparatus for forming a glass-clad glass filament or fiber of the aforementioned character and in FIGS. 13–15, there is shown a modification of the apparatus of FIGS. 1–8. The apparatus of FIGS. 1–8 per se is designed more specifically for the forming of relatively short lengths of fibers having relatively large cross-sectional sizes and with the modification of FIGS. 13–16, said apparatus is more particularly adaptable to the forming of longer lengths of fibers having relatively small cross-sectional sizes.

The term "fiber" as used hereinafter throughout the specification and claims is to be generically interpreted to cover clad elements both of relatively large cross-sectional size and relatively small cross-sectional size as above stated.

Basically, the forming of a light-conducting fiber in accordance with the present invention is accomplished by initially placing a solid rod-like member 10 (FIG. 9) of glass within a tubular member 11 (FIG. 10) of glass having one of its ends closed to form an assembly 12 such as shown in FIG. 11, heating the end 13 of the assembly 12 to a temperature sufficient to render the materials of the rod and tube fusible to each other and suitably viscous for fiber drawing and thereafter continuously drawing the rod and tube together from the end 13 in a direction substantially along the axis of the assembly 12 at a rate sufficient to produce a fiber of a desired cross-sectional size.

However, in order to produce a fiber having superior light-conducting capabilities, the rod 10 is formed of an optical glass having a given relatively high index of refraction and the tube 11 is formed of a glass selected to have a given relatively low index of refraction. For example, a 1.75 index flint glass may be used for the rod 10 and a 1.52 index glass such as soda-lime glass or the like may be used for the tube 11. In addition to the proper selection of the types of glasses for the assembly 12, the relative proportionate thickness of the rod 10 and tube 11 are selected to be substantially the same as that desired of the fiber to be formed therefrom. When drawn to fiber size, the relative proportions of the rod and tube parts which become the core and cladding parts respectively of the fiber do not appreciably change. As an example, a tube 12 having a wall thickness of approximately 1/10 that of the overall thickness or diameter of the assembly 12 will provide a well proportioned fiber when the assembly is drawn to fiber size.

Further, in addition to the above-menitoned requirements for drawing a clad light-conducting fiber in accordance with the invention, the rod 10 is highly optically polished, thoroughly cleaned throughout its length before assembly with the tube 11 and air or gases are evacuated from between the rod and tube during the fiber drawing process in a manner to be described in detail along with the following description of the apparatus used to form the fiber.

Referring more specifically to the fiber drawing apparatus of FIGS. 1–8 in which a glass rod and tube assembly 12 is supported and drawn to a reduced size to form a filament or fiber, it can be seen that said apparatus embodies a pair of vertical parallel main supporting columns 15 and 16 which are anchored at one end in a base 17 and extend upwardly therefrom into an upper mounting plate 18 which, in this particular case, has been bolted or otherwise secured to the ceiling 19 of a room in which the apparatus is used.

It will become more apparent as this description progresses that the columns 15 and 16 which form the main supporting part of the apparatus are selected to be of a height in accordance with the maximum length desired of the fibers to be formed by the apparatus, which length will be determined by the distance between the lowermost end of the glass assembly 12 and a point adjacent the base 17. Thus, in most instances, it is desirable to attain a maximum height of columns by extending the columns 15 and 16 between the floor 20 and ceiling 19 of a room as shown in the drawings. It should be understood, however, that other means may be provided to support the columns should it be desirable to provide apparatus which is self-supporting, that is, without being attached to the ceiling 19.

At a predetermined distance above the level of the floor 20, which again is determined by the length of fibers to be drawn as will become apparent, there is provided a stationary platform 21 having upper and lower shelf parts 22 and 23 respectively which are rigidly secured to the columns 15 and 16. As shown more particularly in FIGS. 1, 2, 3 and 7, the columns 15 and 16 pass through openings 25 (see FIG. 7) in the shelf parts 22 and 23 and detachable forward sections 26 are used to clamp the shelf parts 22 and 23 to the columns 15 and 16 with bolts 24. Since the platform 21 overhangs the base 17 to one side of the columns 15 and 16 (see FIG. 1), a panel 27 is placed endwise between the base 17 and shelf part 23 to support the weight of the overhanging portion of the platform 21. A heating unit or furnace 28, having a circular heating chamber 29 therethrough surrounded by a ring-like resistance-type heating element 30 to be described in more detail hereinafter, is mounted forwardly of the columns 15 and 16 upon an inverted L-shaped bracket 31 which is bolted at 32 or otherwise rigidly secured to the uppermost shelf 22 of the platform 21. The bracket 31 is bifurcated (see FIG. 7) to provide an enlarged opening 33 therethrough over which the heating chamber 29 is substantially centrally aligned. The furnace 28 is clamped to the upwardly disposed surface of the bracket 31 with bolts or the like 34 which extend through enlarged slotted openings 34a in the base 28a of the furnace 28 see FIG. 7. By loosening the bolts 34, the furnace can be adjusted laterally on the bracket 31 within the limits of the openings 34a.

Above the platform 21 and slidably mounted on the columns 15 and 16, there is provided an upper slide member 35 for supporting the glass assembly 12 endwise with its axis directed toward the heating chamber 29 in the furnace 28. The slide member 35 embodies a main bearing section 36 having a detachable semicircular segment 37 (see FIG. 6) by means of which the slide is mounted on the column 15. A laterally extending part 38 integrally formed with the section 36 is provided with a bifurcation 39 which is fitted over the column 16 (as shown more clearly in FIG. 6) and the sides of the bifurcation 39 are provided with replaceable inserts 40 which are accurately spaced relative to each other in such manner as to each intimately engage the column 16 to avoid rotational movement of the slide 35 about the column 15 while permitting the slide 35 to move relatively freely along the column 16. The slide 35, with the segment 37 removed therefrom, is initially placed upon the columns 15 and 16 by slipping the bifurcation 39 over the column 16, placing the section 36 against the column 15 and attaching the segment 37 thereto with bolts 41 see FIG. 6. The bolts 41 are then tightened sufficiently to prevent looseness of the slide member 35 on the column 15 while permitting the same to slide relatively free therealong.

The slide member 35 further embodies a forwardly projecting part 42 which terminates as a clamp 43 in which the glass rod and tube assembly is held adjacent its uppermost end. The clamp 43 embodies a stop or locating member 44 bolted or otherwise secured to one side of the part 42 and an inner side surface 45, see FIG. 6, against which the glass assembly is placed and held by a screw clamp jaw 46. The jaw 46 is moved into or out of engagement with the assembly 12 by operation of a thumb screw 47 threaded through a supporting plate 48 which is fastened to the other side of the part 42 by bolts or the like 49. It is pointed out that the inner side surface 45, stop member 44 and the clamp jaw 46 which are engaged by the glass assembly 12 are preferably provided with a covering of heat-insulating material such as asbestos or the like and the member 44 and jaw 46 are inclined oppositely to each other in such manner as to inherently urge the assembly 12 against the surface 45 when it is clamped, as just described. It is also pointed out that the clamp 43 and the heating element 28 are so positioned relative to each other as to locate a glass assembly 12 which is held by said clamp approximately in centrally aligned relation with the circular heating chamber 29 in the furnace 28. An accurate axial alignment of the heating chamber 29 with a glass assembly 12 when held by the clamp 43 is accomplished by adjusting the furnace 28 laterally on its supporting bracket 31 when its clamping bolts 34 are loosened. Once adjusted, the furnace is firmly clamped to its supporting bracket 31 by the tightening of bolts 34.

Movement of the slide 35 along the columns 15 and 16 to move the glass rod and tube assembly 12 into or out of the heating chamber 29 in the furnace 28 is accomplished by a vertically extending lead screw 50 journalled at its upper end in the upper mounting plate 18 and similarly journalled at its lower end in the shelf 22 of the platform 21, see FIG. 2. The lead screw 50 passes through a threaded rearwardly extending lug 51 which is fastened to the slide member 35 by bolts or the like 52 and rotation of the lead screw 50 will cause the slide 35 to advance along the columns 15 and 16 in a direction determined by the direction of rotation of said lead screw 50.

Figure 5:
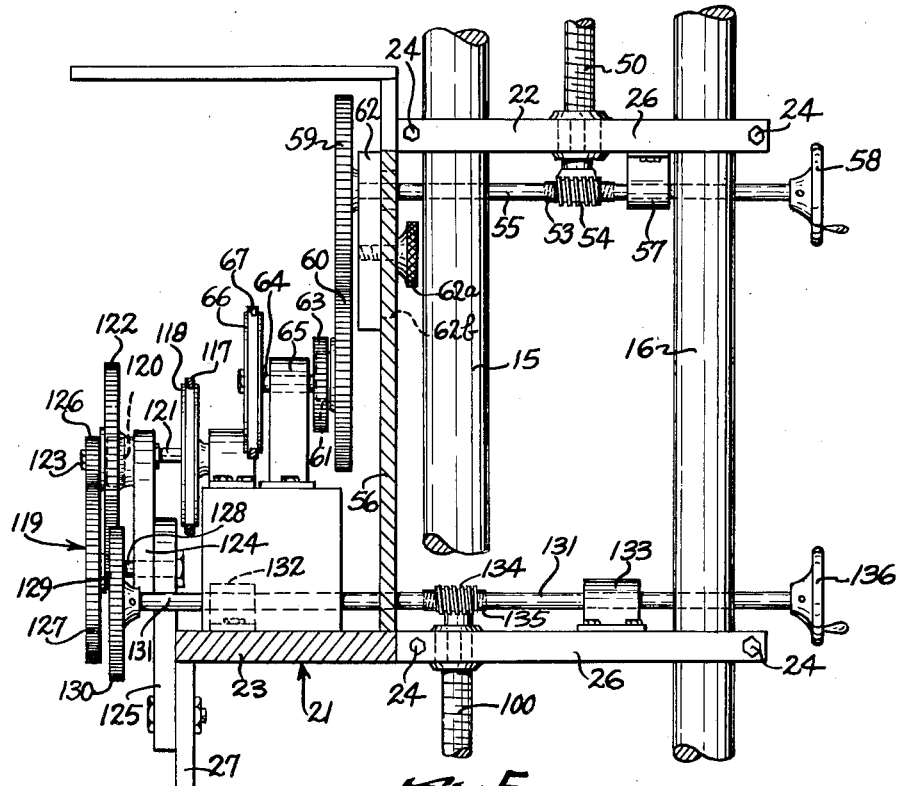
FIG. 5 is an enlarged fragmentary cross-sectional view taken substantially on line 5—5 of FIG. 2 looking in the direction of the arrows.
Figure 6:
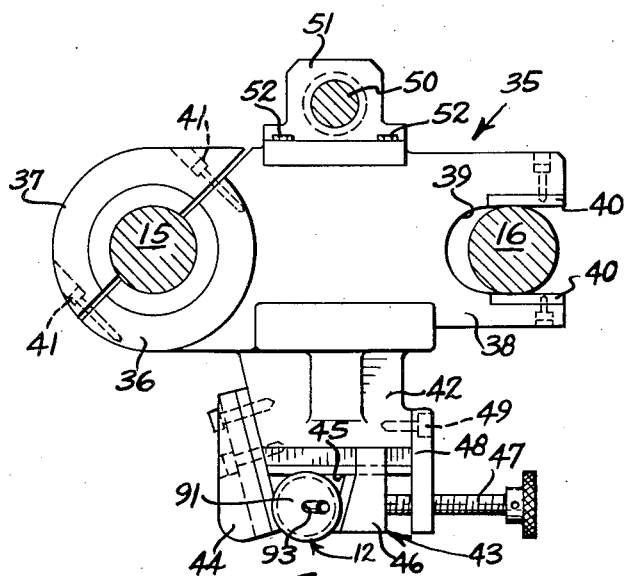
FIG. 6 is an enlarged transverse cross-sectional view taken on line 6—6 of FIG. 1 looking in the direction of the arrows.

Operation of the lead screw 50 is accomplished either manually, as will be described, or automatically through the use of a gear train which is driven by a belt and pulley arrangement from a motor housed between the shelf parts 22 and 23 of the platform 21. Referring more particularly to FIGS. 4 and 5, it will be seen that, at the lowermost end of the lead screw 50, there is provided a worm follower gear 53 which meshes with a worm gear 54, see FIG. 5. The worm gear 54 is mounted on a shaft 55 which extends horizontally through a vertical wall part 56 disposed between the shelf parts 22 and 23 of the platform 21 and is supported by journallings in the wall part 56 and in a depending bracket 57 secured to the underside of the shelf part 22 (see FIGS. 1, 4 and 5). A hand wheel 58 is provided on one end of the shaft 55 by means of which said shaft may be manually rotated to actuate the gears 53 and 54 and thus rotate the lead screw 50 to raise or lower the slide 35 depending upon the direction of rotation of the hand wheel.

Automatic operation of the lead screw 50 to raise and lower the slide 35 is accomplished by means of a spur gear 59 secured to the end of the shaft 55 opposite to the hand wheel 58. The gear 59 is driven by a second similar gear 60 in mesh therewith which, in turn is driven by a pinion gear 61. The gears 60 and 61 are mounted at one end of a supporting arm 62 which is pivotally mounted to the shaft 55 so as to permit the pinion gear 61 to be selectively moved into or out of mesh with a drive gear 63 by the swinging of the arm 62 toward or away from the drive gear 63. A thumb-operated lock screw 62a carried by the arm 62 extends through an arcuate slot 62b in the wall 56 (see FIGS. 4 and 5) by means of which the arm 62 may be locked in a desired position with the pinion either in or out of mesh with the drive gear 63. The drive gear 63 is mounted on one end of a shaft 64 journalled in a bearing block 65 and a pulley 66 which is driven by a belt 67 from a motor 68 is mounted at the opposite end of the shaft 64.

When the pinion is in mesh with the drive gear 63, it can be seen that operation of the motor 68 will, through the gear train 63, 61, 60, 59, 54 and 53, rotate the lead screw 50 to raise or lower the slide 35. The motor 68 may or may not be reversible. If it is not reversible, the motor would be used only to automatically lower the slide 35 and the gears 61 and 63 would be disengaged to permit the raising of the slide 35 manually with the use of the hand wheel 58.

In drawing a fiber from the glass rod and tube assembly 12, the end 13 of the assembly which is initially sealed or closed as illustrated in FIGS. 10 and 11 is first lowered into the heating chamber 29 of the furnace 28 and heated until the rod and tube glasses become softened to a point where they may be drawn to a reduced or fiber size.

The furnace 28 embodies a pair of separable cast or molded metallic sections 70 and 71 formed of an electrical conducting material such as aluminum or the like and each embody a water jacket 72 and 73 respectively adjacent one end wall thereof. The sections 70 and 71 are substantially identical in construction and are open at their ends opposite to the water jackets so as to form a rectangular enclosure 74 therebetween when said open ends are placed in facing relation with each other, as shown in FIG. 7. The electrical heating element 30 which is formed circular in shape with laterally projecting tab parts 30a and 30b is placed substantially centrally within the enclosure 74 and held therein by its tab parts 30a and 30b which make electrical contact with each of the respective sections 70 and 71—see FIG. 7. A strip 75 of electrical insulating material is placed between the parts 30a and 30b of the element and the assembly of the furnace is made secure by the clamping of the sections 70 and 71 together as shown in FIG. 7 with a suitable clamp 76 or the like. Electrical insulating material 77 is placed between the adjacent parts of the clamp and sections 70 and 71 to electrically insulate the clamp from the said sections 70 and 71.

Electrical connectors or terminals 78 and 79 are provided on the above-mentioned end walls of the respective sections 70 and 71 to which a suitable source of electric current carried by leads 80 and 81 is applied across the furnace sections 70 and 71 to cause the element 30 to become heated by its inherent resistance to the passage of said current between the terminals 78 and 79. Electrical current applied to the terminal 78 through the conductor 80, for example, will pass through the body of the section 71, tab part 30b of the element 30 which is in electrical contact with said section 71, around the circular portion of the element 30, through the tab part 30a into the body of the section 71 and outwardly through the terminal 79 and conductor 81. In order to confine the heat, as much as possible, within the heating chamber 29 which is surrounded by the element 30, a heat-insulating material 82 is provided in the space between the element 30 and the adjacent walls of the enclosure 74. Circulating cold water or any other suitable liquid coolant is directed through the water jackets 72 and 73 by means of interconnecting hose lines 83, 84 and 85 so as to dissipate a substantial portion of any heat which is transferred from the element 30 into and through the sections 70 and 71. This circulaiton of cold water serves two major purposes; one being to maintain the outer surfaces of the furnace cool enough to avoid injury by burning if accidentally touched by an operator of the device and, secondly, to maintain the temperatures of the terminals 78 and 79 low enough to prevent overheating or burning of the electrical connections and leads 80 and 81 thus avoiding costly replacement or repair of the furnace parts.

With the glass rod and tube assembly 12 lowered by the slide 35 to a position where its end 13 is well within the heating chamber 29 in the furnace 28, substantially as illustrated more clearly in FIG. 12, a cover 86 of heat-resistant material such as mica or the like is placed over the chamber 29 and around the glass assembly 12 so as to allow only enough clearance around the assembly 12 to permit it to pass freely therethrough without engaging the cover 86. This prevents most of the heat from rising out of the heating chamber 29 and as an added precaution against an up-draft through the chamber 29, an enlarged depending tubular enclosure member 87 (see FIGS. 1, 2, 3 and 12) is provided on the furnace beneath the chamber 29. The lowermost end of the member 87 is provided with an adjustable closure means such as an iris diaphragm 88 or the like through which a fiber from the glass assembly 12 is drawn in a manner to be presently described in detail. By preventing any substantial up-draft of air through the member 87 and chamber 29, fracturing by thermal shock of the glasses of the assembly 12 and fiber to be drawn therefrom is avoided and a substantially constant desired temperature can be maintained within the chamber 29.

The drawing of a fiber from the glass assembly 12 is started by passing a solid glass rod 89 (see FIG. 12) upwardly through the tubular enclosure 87 into engagement with the end 13 of the glass assembly 12 whereupon the assembly 12, when heated to a suitable fiber drawing temperature such as, for example, 1300° Fahrenheit for the above given examples of glasses 10 and 11, will fuse to the abutting end of the glass rod 89. The rod 89 is then pulled downwardly drawing the glasses of the assembly 12 along with it in the form of a fiber 90 (see FIG. 3).

In order to provide a substantially perfect interfacial fusion between the glasses of the rod 10 and tube 11 parts of the assembly 12, a vacuum is drawn in the unfilled space 11a in the tube 11, above the rod part 10 (see FIG. 3) so as to outgas the space between the rod 10 and tube 11 as fusion takes place adjacent its lower end. The action of the vacuum also tends to collapse the heated end of the tube 11 onto the rod 10. The space 11a is vacuumized by sealing the uppermost end of the tube 11 with a stopper or the like 91 having a tube 92 extending longitudinally therethrough, see FIG. 3, to which a vacuum line 93 is attached (see FIGS. 1, 2 and 3) and a suitable conventional pump 94 for creating the vacuum in the line 93 is provided on the platform 22 (see FIGS. 1 and 2). Since the glasses of the rod and tube assembly 12 are heat-softened at their lowermost ends during the drawing of a fiber therefrom and there is a tendency for the rod member 10 to be lifted in the tube 11 under the influence of the vacuum in the space 11a, a support 95, see FIG. 3, consisting of a rod-like member of glass, or any other suitable material is placed between the stopper 91 and the upper end 11b of the glass rod 10 (see FIG. 3) to hold it in place during the drawing of the fiber 90.

Having started the fiber drawing process by pulling the end 13 of the glass assembly 12 down with the rod member 89 (see FIGS. 12 and 13) the fiber is clamped to a lower slide 96 which is adapted to travel downwardly on the columns 15 and 16 automatically at a predetermined rate, as will be described in more detail hereinafter, and the rod member 89 is flame-cut or otherwise severed from the fiber 90. In order to prevent fracturing of the fiber by allowing cool air to flow into the enclosure 87, the iris diaphragm 88 is closed to a size such as to allow only a minimum of clearance around the fiber.

By pulling the fiber 90 endwise and downwardly at a precontrolled uniform rate while feeding the rod and tube assembly 12 downwardly into the furnace also at a precontrolled slower uniform rate in accordance with the rate of removal of the material from said assembly 12 by the forming of the fiber 90, the cross-sectional size of the fiber will be maintained substantially constant and its size will be determined by the temperature to which the glass assembly 12 is heated and the relative rates of lowering of the assembly and drawing of the fiber. As an example, with an assembly such as 12 embodying a rod part of flint optical glass having an index of refraction of approximately 1.75 and a tube part of conventional soda-lime glass having an index of refraction of approximately 1.52 and an outer diameter of approximately one inch, a fiber 1/10 of an inch in diameter can be formed successfully by heating the assembly to a temperature of approximately 1300° Fahrenheit, lowering the same at a rate of 1/8 of an inch in 209 seconds while drawing the fiber downwardly from the assembly at a rate of 1/8 of an inch in 2.09 seconds or, in other words, drawing the fiber at a rate of approximately 100 times faster than the rate of descent of the rod and tube assembly 12.

Referring more particularly to the construction of the lower slide 96 and its associated drive means, it can be seen in FIGS. 1, 2 and 8 that the slide 96 embodies a main bearing portion 97 fitted to the column 15 and an integrally formed laterally extending bifurcated part 98 fitted to the column 16 much in the same manner as the similar parts 35 and 38 of the upper slide 35. In the case of the slide 96, however, the main bearing portion embodies an integrally formed rearwardly disposed threaded part 99 through which a vertical lead screw 100 passes. The lead screw 100, which is located behind the column 15 and journalled at one end in the base 17 and at its other end in the lower shelf part 23 of the platform 21, is used to drive the slide 96 downwardly along the columns 15 and 16. A half section 101 of the bearing portion 97 and the threaded part 99 is pivotally mounted at 102 to the main body portion of the slide 96 and secured in place by thumb screws 103 which thread into said main body portion. With the thumb screws detached from the main body portion of the slide 96, the half section 101 may be pivoted at 102 away from the column 15 and the lead screw 100, as shown by dot-dash lines in FIG. 8, so as to permit quick and easy removal of the slide 96 from the columns 15 and 16.

On the upper surface of the part 98 of the lower slide 96, there is provided a detachable bracket 104 which overhangs forwardly of said part 98 and is held in a desired adjusted position on the slide 96 by means of a pair of holddown screws 105 or any other similar arrangement. In the case shown, the screws 105 are threaded into the part 98 and extend upwardly through an enlarged slot 106 in the bracket 104. Washers 107 which bear against the upper surface of the bracket 104 are provided beneath the heads of the screws 105 so that, when tightened, the heads of the screws 105 will bear against the washers 107 to clamp the bracket 104 securely in a desired adjusted position on the slide 96.

A clamp 108 which is substantially identical to the clamp 43 on the slide 35 is provided at the forward end of the overhanging portion of the bracket 104. The clamp 108 embodies a fixed stop 109 and an adjustable jaw 110 operated by a thumb screw 111 which is threaded through a fixed supporting plate 112 on the bracket 104. Since the clamp 108 is used to grip the fiber 90 which is relatively small in diameter as compared to the glass assembly 12, filler members or inserts 113 are provided between the stop 109 and jaw 110 to take up a substantial portion of the space between the stop 109 and jaw 110 and thereby align the fiber gripping faces 114 and 115 of the inserts 113 substantially directly beneath the point at which the fiber is withdrawn from the glass assembly 12 whereby a straight draw of the fiber substantially along the axis of the glass assembly 12 is accomplished. It is pointed out that a fine adjustment of the alignment of the clamp 108 relative to the axis of the glass assembly can be made by loosening the screws 105 enough to slide the bracket 104 laterally on the slide 96 whereupon the screws are again tightened when a desired alignment of the clamp 108 relative to the axis of the glass assembly is obtained.

With the lower slide 96 placed on the columns 15 and 16 and in threaded engagement with the lead screw 100, as shown in FIGS. 1, 2, 3 and 8, it is driven downwardly along the columns 15 and 16 by means of a motor 116 which operates through a belt 117, pulley 118 and gear train 119 (see FIGS. 4 and 5) to drive the lead screw 100.

The gear train 119 embodies a pinion gear 120 which is mounted on a shaft 121 driven by the pulley 118. The pinion gear 120, in turn meshes with a spur gear 122 mounted on a shaft 123 supported by brackets 124 and 125 secured to the panel 27, see FIG. 5, and the shaft 123 also carries a pinion gear 126 which meshes with another spur gear 127 supported on a shaft 128 also mounted on the brackets 124 and 125. A third pinion gear 129 on the shaft 128 is in mesh with a spur gear 130 mounted at one end of an elongated shaft 131 which is journalled in a pair of bearings 132 and 133 on the shelf part 23 of the platform 21 and the shaft 131 is provided with a worm gear 134 which drives a worm follower gear 135 fixed to the upper end of the lead screw 100. A hand wheel 136 is provided at the end of the shaft 131 opposite to its end having the gear 130 thereon to provide means for manually rotating the lead screw to raise or lower the slide 96 depending upon the direction of rotation of the hand wheel 136. Automatic operation of the slide 96 is accomplished by operation of the motor 116 which is adapted to cause rotation of the lead screw 100 through the belt 117, pulley 118 and gear train 119. The rate of travel of the slide 96 is controlled by the selection of gear sizes used in the train 119 which is made in accordance with the normal operating speed of the motor 116. Likewise, the rate of travel of the upper slide 35 is controlled by the selection of gear sizes in the gear train operated by motor 68. Thus, by a change of gears in either of the above-mentioned gear trains and/or a change in the operating speeds of the motors 68 or 116, the slides 35 and 96 can be caused to traverse the columns 15 and 16 at any desired speeds relative to each other in order to control the size of fiber 90 being drawn.

It is pointed out that through a proper selection of gears, in known fashion, the above described gear trains which drive the upper and lower lead screws 50 and 100 may be coupled together and operated simultaneously by one motor such as motor 68, for example. In this case, the selection of gears would be such as to operate the upper and lower lead screws 50 and 100 at the above discussed slower and faster rates of speeds respectively. By driving both of the lead screws 50 and 100 with a single motor, a definite ratio of driving speeds for said upper and lower lead screws can be assured regardless of fluctuations or variations in the speed of the drive motor which might result from fluctuations, in electrical current supplied to the motor or other causes.

It should also be understood that tapered fibers may be formed, with the apparatus of the invention by proper control of the temperature of the glasses being drawn and by operation of the lower lead screw 100 independently as described above. In the drawing of a tapered fiber, the glass assembly 12 is lowered into the furnace 28 at a controlled constant uniform rate while the fiber is drawn therefrom at a rate of speed which changes gradually from an initial starting rate in accordance with the degree of taper desired of the fiber. By gradually increasing the speed of drawing an upwardly converging taper will be produced on the fiber whereas a downwardly converging taper can be produced by gradually decreasing the speed of drawing. Any number of various cross-sectional shapes or sizes can be produced on the fibers as they are being drawn by intermittently or alternately changing the speed at which the lead screw 100 is operated along with proper control of the temperature in the furnace 28 and the rate at which the glass assembly 12 is lowered into said furnace.

When the fiber 90 is drawn by the slide 96 to a point where the slide 96 approaches the base 17 of the apparatus as shown by dot-dash outline in FIG. 1, a second slide 96' identical in all respects to the slide 96 is clamped to the columns 15 and 16 and lead screw 100 at a point adjacent the uppermost end of the lead screw also as shown by dot-dash outline in FIG. 1. The slide 96' is placed on the columns 15 and 16 with its section 101 initially opened in the manner illustrated by the dot-dash lines in FIG. 8. This is accomplished by first slipping the bifurcated end of the slide 96' over the column 16 preferably from the rear of the apparatus and swinging the opposite end of the slide into engagement with the column 15 and lead screw 100 after which the section 101' is closed and secured by the thumb screws 103'. With the second slide 96' in place on the columns 15 and 16 at the upper end of the lead screw 100, the portion of the fiber which passes thereby is secured in the clamp 108' of the second slide and the end of the fiber which is clamped in the slide 96 (which is now adjacent the base 17 of the apparatus as shown by dot-dash outline) is immediately released. The portion of the fiber 90 which now extends between the two slides 96' and 96 now on the columns 15 and 16 is flame-cut or otherwise severed below the second slide 96' and removed as a finished product from the apparatus whereupon the slide 96 adjacent the base 17 which is still continuing to move downwardly is removed from the columns 15 and 16 and set aside to repeat the above-described operation. The drawing and cutting of the fiber 90, as just described, is repeated while the apparatus is continuously in operation, that is, without interrupting the downward travel of the slide 35 carrying the glass assembly 12 until the material of the assembly 12 is exhausted or cannot be lowered any further into the furnace 28. At this point, the whole process is started anew.

From the above, it can be seen that the length of fibers which can be produced by the apparatus of FIGS. 1–8 is limited by the distance between the base 17 and the lower shelf part 23 of the platform 21.

In instances where it is desired to form a fiber considerably longer than would be possible with a straight-line drawing procedure, such as described above with relation to FIGS. 1–8, the apparatus just described can be modified as illustrated in FIGS. 14–15.

The apparatus of FIGS. 13–16 embodies a pair of main supporting columns 138 and 139, a stationary furnace 140 and an upper slide member 141 for supporting a glass rod and tube assembly 12', all of which are substantially identical in construction and function to the similar parts of the apparatus of FIGS. 1–8 just described. At the base 142 of the apparatus of FIGS. 13–16, however, there is provided means to operate a vertically extending lead screw 143 which drives the upper slide member 141 along the columns 138 and 139 to gradually lower the glass assembly 12' into the furnace while a fiber 90' is drawn therefrom in precisely the same manner as described above with relation to the drawing of fiber 90.

On the base 142, there is provided a pair of rotatable drums 144 and 144a and drive means 145 adapted to rotate the drums and lead screw 143 simultaneously at precontrolled rates of speed whereupon the fiber 90, when attached to one of the drums 144 or 144a, will be simultaneously drawn from the glass assembly 12' and wound on the particular drum to which it is attached. By this method, it can be seen that a continuous extremely long length of fiber can be produced. The fiber 90', however, must be of a cross-sectional size small enough to flex sufficiently permitting it to be wound around the drums without fracturing.

In winding the fiber 90' on the drum 144 or 144a, it is desirable, in many instances, to produce an accurately formed helix of fiber 90' having closely packed convolutes. Such fiber helices or hoops are used to considerable advantage in the fabrication of various types of fiber optical light or image-transferring devices such as disclosed in co-pending applications Serial No. 703,914 and Serial No. 719,540, for example. In order to accurately wind the fiber 90' on the drums 144 and 144a so as to produce the above-mentioned helices having convolutes in close adjacent side-by-side relation with each other, a level-wind arrangement 146 is provided on the apparatus of FIGS. 13–16 to guide the fiber 90' laterally along the drums 144 and 144a during the fiber-drawing and winding operation. This level-wind arrangement which will be described in detail hereinafter is actuated by the drive means 145 simultaneously with the rotation of the drums 144 and 144a and the lead screw 143.

The drive means 145 embodies a motor 147 (see FIG. 13) which, through various belt, pulley and gear arrangements, is operatively connected to the drums 144 and 144a, lead screw 143 and the level-wind arrangement 146 as follows:

The drums 144 and 144a are each rotatably supported on the base 142 of the apparatus by separate drive spindles 148 and 149 which are journalled in bearing housings 150, such as shown in cross-sectional detail in FIG. 14, and it is to be understood that while only the construction relating to drum 144, shown in FIG. 14, will be set forth in detail, both of the drums 144 and 144a are identical and similarly mounted on the base 142. The housing 150 which is provided with a forward bearing section 151 and a rear bearing section 151a is mounted on the base 142 by means of brackets 153 and 154 and a pulley 155 is operatively connected through a conventional magnetic clutch 152 to the spindle 148 to provide means for driving the drum 144.

The clutch 152 is provided with a pair of commutator rings 152a which are engaged by stationary electrical contacts 152b connected to a suitable source of electrical current through an electrical switch 152c mounted on the base 142 (see FIG. 13). By operating the switch 152c to pass current through the contacts 152b and commutator rings 152a, the clutch 152 will be energized to connect the pulley 155 in driving relation with the spindle 148. However, when the switch 152c is operated to disconnect the contacts from the source of current, the clutch will be de-energized and the pulley will be disconnected from driving relation with the spindle 148. Thus, by operation of the switch 152c, the drum 144, which is driven by the pulley 155 through the drive means 145, as will be described in more detail hereinafter, can be stopped or put into operation, as desired, while the drive motor 147 is in continuous operation. The drum 144a is similarly driven by means of a pulley and magnetic clutch arrangement 156 which is identically operated by an electrical switch 156a (see FIG. 13). Each of the drums 144 and 144a have hub parts 157 (see FIG. 14) which are adapted to mate with a conical adaptor 158 on the outermost end of each of their respective drive spindles 148 and 149. The adaptors 158 are pinned at 159 or otherwise fixed to rotate with their respective spindles and are provided with outwardly protruding key members 160 which fit into keyways 161 in the hub parts 157 of the drums so as to prevent rotational slippage of the drums on the adaptors 158 when the drums are in a position of use on each of their respective spindles 148 and 149. In order to hold the drums 144 and 144a securely on the adaptors 158, during operation of the apparatus, springs 162 (see FIG. 14) are secured at one of their ends to each of the spindles 148 and 149 and are provided at their opposite ends with hook parts 163 which are adapted to be latched over a rod 164 or the like extending substantially diametrically across each of the respective drums, as shown in FIGS. 13 and 14. A finger grip part 165 is provided on each of the springs by means of which the latching of their hook parts 163 can be effected.

Around the drive pulleys 155 and 156, there are provided belts 166 and 167 which are driven by pulleys 168 and 169 respectively mounted on shafts 170 and 171 extending outwardly from within a gear box 172. The shafts 170 and 171 are driven through conventional gearing (not shown) within the box 172 by means of a third shaft 173 which enters the box 172 at the opposite side thereof (see FIG. 14). A pulley 174 on the shaft 173 is then driven by a belt 175 extending around one of a pair of pulleys 176 and 177 on a shaft 178 which is journalled in a bearing box 179 supported by a bracket 180 which is suspended from a shelf part 181 upon which the gear box 172 is mounted. The pulley 177 of said pair thereof is driven by a belt 182 and pulley 183 on a shaft 184 which is rotatably supported by and extends into a gear box 185. On the shaft 184, there is also provided another pulley 186 which, in turn, is driven by a belt 187 from the motor 147. The motor 147 then, through belt 184, pulleys 186 and 183, belt 182, pulleys 177 and 176, belt 175, pulley 174, gear box 172, pulleys 168 and 169, belts 166 and 167 and pulleys 155 and 156, drives the respective spindles 148 and 149 to rotate the drums 144 and 144a. At the same time, however, the motor 147 which drives the shaft 184, as just described, also drives the lead screw 143 through conventional gearing (not shown) in the box 185 which interconnects the shaft 184 with another shaft 188 having a pulley 189 thereon. A belt 190 around the pulley 189 and another pulley 191 mounted on a shaft 192 leading into a conventional right-angled gear drive mechanism 193 actuates, through the mechanism 193, a vertically extending shaft 194 which is geared to the lead screw by means of a pinion gear 195 on the lead screw 143 and a spur gear 196 on the shaft 194 interconnected with an idler gear 196a carried by a bracket 196b by means of which the idler gear may be swung on the base 142 out of mesh with the gears 195 and 196 when it is desired to disconnect the lead screw 143 from the drive mechanism 145. When so disconnected, the lead screw 143 may be operated by a hand wheel 194a to manually raise or lower the slide 141, as desired.

Along with the driving of the drums 144 or 144a and the lead screw 143 by the motor 147, the level-wind arrangement 146 which guides the fiber laterally across the drums is simultaneously driven by the same motor 147. The level-wind arrangement 146 embodies a platen 198 upon which there is provided a pair of felt pads or the like 199 and 200 over which the fiber 90' is passed before being attached to and wound on one or the other of the drums 144 or 144a. If, for example, the fiber 90' is being wound on the drum 143, it will be directed over the pad 199 and lightly held thereagainst by a spring clamp 201. It is pointed out that the holding tension of the clamp 201 is very gentle so as to allow the fiber 90' to be easily drawn therethrough by the drum 144 without marring or in any way damaging the fiber. In order to assure a smooth action between the clamp 201 and the fiber 90', the fiber is lubricated by saturating the pads 199 or 200 with a liquid such as alcohol or the like which will evaporate from the fiber 90' after winding without leaving a residue thereon. Containers 202 and 203 having tubes 204 and 205 respectively leading to the pads 199 and 200 are provided to dispense the said liquid. An additional liquid dispenser 206 and a pad 207 similar to the arrangement just described may also be provided, as shown in FIG. 13, between the base 142 and furnace 140 to assure adequate lubrication of the fiber 90'. The lubrication of the fiber 90' in the above manner also assures a more even winding of the fiber helices on the drums by overcoming the tendency for the convolutes of a fiber helix to repel each other due to a build-up of a static charge or other effects on the fiber 90' as it is drawn and wound. It is pointed out that when winding the fiber 90' on drum 144a, it is moved over to the pad 200 and the clamp 201 is pivoted at 201a towards the pad 200 to urge the fiber against the pad 200.

In addition to the platen 198, the level-wind arrangement 146 embodies a guide rod 208 and an elongated drive screw 209 disposed parallel to the rod 208 (see FIG. 15). The platen 198 is mounted on one end of the rod 208 and screw 209, as shown in FIG. 15, and a bracket 210 interconnecting the rod and screw is provided at their opposite ends to hold them in accurate parallel relation with each other. A support 211 which is bolted at 212 or otherwise secured to the base 142 is provided to hold the level-wind arrangement 146 in place, see FIG. 15, and to guide the platen 198 along a path parallel to the axes of the drums 144 and 144a when the level-wind arrangement 146 is in operation. This is accomplished by means of an upper bearing section 213 on the support in which the rod is guided by a sliding fit. Beneath the bearing section 213, there is provided a rotatable internally threaded sleeve 214 in the support 211 through which the lead screw 209 is threaded and a ring gear 215 encircling the screw 209 is fixed to the sleeve 214 to provide means by which the sleeve 214 can be rotated. Rotation of the sleeve will cause the screw 209 to advance therethrough and carry the platen 198 toward or away from the support 211 depending upon the direction of rotation of the sleeve 214.

The gear 215 and sleeve 214 are driven from the shaft 173 which is driven by the motor 147 through belt, pulley and gear arrangements which were described in detail hereinabove. On the shaft 173, see FIG. 14, there is keyed or otherwise attached a pulley 216 connected by a belt 217 to another pulley 218 on a shaft 219 which is rotatably supported by a bracket 220 mounted on the upper surface of the gear box 172. A pair of magnetic clutches 221 and 222, see FIG. 14, similar to the above-described clutches 152 are carried by the shaft 219 and bevel gears 223 and 224 are attached to the respective clutches 221 and 222. In mesh with both of the gears 223 and 224 is an enlarged third bevel gear 225 supported at the lowermost end of a vertical drive shaft 226. The uppermost end of the shaft 226 is then provided with a pinion gear 227 which, through a gear train (see FIG. 16) embodying gears 228, 229 and 230, drives a shaft 231 leading upwardly into a conventional right-angled gear box 232 from which a shaft 233 having a gear 234 thereon extends outwardly in such alignment with the ring gear 215 as to place the gear 234 in mesh with the above-described ring gear 215 which drives the rotatable sleeve 214.

From the above, it can be seen that means has been provided to operate the level-wind apparatus 146 simultaneously with the operation of the drums 144 or 144a and the lead screw 143.

In order to cause the level-wind apparatus to advance outwardly from the base 142 during the winding of the fiber 90' on one of the drums 144 or 144a and inwardly towards the base 142 during the winding of the fiber on the other of the drums for accurately guiding the fiber over the drums as will be more fully explained hereinafter, the magnetic clutches 221 and 222 are each selectively energized by their respective electrical contacts 221a and 222a through a three-way selector switch 235 (see FIGS. 13 and 14). The selector switch 235 which connects the contacts 221a and 222a in circuit with a suitable source of current has a center or neutral position wherein the current is disconnected from both of the contacts 221 and 222a and a second position wherein the current is only connected to one of the contacts 221a and a third position wherein the current is only connected to the other of said contacts 222a. With the selector switch in its neutral position, both of the magnetic clutches 221 and 222 will be de-energized thereby causing the gears 223 and 224 to float on the shaft 219 without driving the gear 225. In this manner, the feed to the level-wind arrangement is completely disconnected. By placing the switch 235 in its second position which passes current through the contacts 221a, the magnetic clutch 221 is energized to cause the gear 223 to be carried thereby and rotate with the shaft 219 so as to drive the gear 225 and thereby rotate the lead screw 209 to move the platen 198 away or towards the base 142 depending upon the direction of rotation of the shaft 219. When the switch 235 is placed in its third position, current will be disconnected from contacts 221a and supplied only to the contacts 222a so as to energize the magnetic clutch 222 and thereby engage the gear 224 causing it to rotate with the shaft 219 and drive the bevel gear 225 in the opposite direction so as to reverse the direction of feed of the lead screw 209 and thus reverse the direction of travel of the platen 198.

Having described the various drives which operate to simultaneously lower the upper slide 141 along the columns 138 and 139, rotate the drums 144 and 144a and advance the level-wind arrangement along its path of travel, the fiber-drawing and winding operation with the apparatus of FIGS. 13–16 proceeds as follows:

With the fiber 90' started and drawn from the glass assembly 12', as described above, it is passed over the upper lubricating pad 207 and urged against the lower lubricating pad 199 by the clamp 201 and then taped or otherwise fastened to the drum 144 when the platen 198 is located back adjacent the base 142. With the motor 147 operating at this time, the switch 152c is thrown to cause the drum 144 to rotate and draw the fiber 90' from the glass assembly which is heated in the furnace 140. Approximately at the same time, the switch 235 is positioned to cause the platen 198 to advance outwardly away from the base 142 and thereby level-wind the fiber on the drum 144. It should be understood that the speed ratio between the rate at which the drum 144 is rotated and the rate at which the glass assembly 12' is lowered into the furnace 140 will determine the size of fiber 90' being drawn, as described in detail hereinabove. Also, the corresponding rate at which the platen 198 is moved relative to the base 142 will determine the proximity of the convolutes of the fiber helix being wound on the drum 144. The relative rates of rotation of the drum, lowering of the slide 141 and movement of the platen 198 are, of course, determined by the relative ratios and sizes of the gears and pulleys used in the drive mechanism 145 which are interchangeable and preselected in accordance with the size desired of the fiber 90' and also in accordance with the compactness desired of the turns or convolutes of the fiber helix which is formed on the drums.

When the platen 198 of the level-wind arrangement 146 has advanced forwardly to the point where the fiber has been wound over a desired section of the drum 144, the clamp 201 is released from the fiber 90' and the fiber is cut or broken away from the drum 144. Then, as quickly as possible, the free end of the fiber 90' is taped or otherwise attached to the drum 144a adjacent its forward end and the drum 144a is caused to rotate by operating the switch 156a. At the time the drum 144a is started to rotate, the switch 235 is positioned to cause the level-wind device to reverse its direction of travel and now proceed toward the base 142. The fiber, now passing over pad 200, is urged thereagainst with the clamp 201. While the winding of the fiber 90' on the drum 144a is taking place, the drum 144 is stopped by actuation of switch 152c and the fiber helix thereon is removed by slipping it off the forward end of the drum.

In order to provide means permitting quick and easy removal of a fiber helix from the drums 144 and 144a, they are each provided with a removable outer section 237 which may be either completely removed or dropped slightly toward the axes of the drums to thereby loosen the fiber helix on the drums.

The sections 237 (one of which will be described with relation to drum 144, see FIG. 14) are provided with a cam surface 238 adjacent one end and a cam lock 239 adjacent their opposite ends. A camming block 240 fixed to the main portion of each of the drums, internally thereof, as shown in FIG. 14, is engaged by the cam surface 238 of the section 237 causing the section 237 to lift into place with its outer surface in substantially concentric relation with the outer surface of the main portion of the drum when the section 237 is positioned as shown in FIG. 14 and the cam lock 239 also similarly lifts the section 237 and holds it securely in place. With the cam lock 239 released to lower its adjacent end of the section 237, said section, when drawn forwardly away from the block 240, will drop down toward the axis of its drum thereby lowering its outer surface to loosen the fiber helix wound on the drum and permit easy removal of the fiber helix.

It has been found that by providing a sleeve of a pliable plastic material or the like 241 on the drums 144 and 144a, as shown in FIG. 14, and by winding the fiber over the sleeve, the fiber helices can be more easily removed by slipping the sleeve off the drums thereby carrying the fiber helix with the sleeve.

When the winding of the fiber 90' on the second drum 144a, as mentioned above, has been completed, the fiber 90' is cut or broken and its free end is switched back to the drum 144 and the above-outlined procedure is repeated until the material of the glass assembly 12' has been exhausted or cannot be lowered any further into the furnace 140.

It is pointed out that the temperature to which the glass assembly 12' is heated and the relative rates of lowering of the assembly and drawing of the fiber are all computed in accordance with the types of glasses being drawn and the size desired of the finished fiber, as set forth in detail hereinabove.

It should also be understood that fiber-winding drums ranging in sizes from a few inches in diameter to several feet in diameter may be used to produce fiber hoops of any desired circumference. However, the speed of rotation of the drums must be adjusted in accordance with their size and with the rate of drawing desired of the fiber being wound thereon. Furthermore, it is pointed out that, if desired, several layers of fiber may be wound, one over the other, on the drums 144 and/or 144a with or without the use of the level-wind arrangement 146.

While the above-described fiber-drawing process has referred more particularly to the drawing of a rod and tube glass assembly 12 or 12' it is pointed out that either the apparatus of FIGS. 1–8 or its modification which embodies FIGS. 13–16 can be used to draw other types of fibers such as would result from the drawing of a single solid rod of glass or a bundle of separate fibers which are in one way or another held together as a unit. In so doing, the single rod of glass or the bundle of fibers would replace either the glass assembly 12 or the assembly 12' and the drawing of a fiber from whatever type of glass assembly is used would proceed as described hereinabove with relation to the fiber 90 or the fiber 90'.

From the foregoing, it will be seen that efficient and economical means and method have been provided for accomplishing all of the objects and advantages of the invention. Nevertheless, it is apparent that many changes in the details of construction, arrangement of parts or steps in the process may be made without departing from the spirit of the invention as expressed in the accompanying claims and the invention is not to be limited to the exact matters shown and described as only the preferred matters have been given by way of illustration.

Having described our invention, we claim:

1. Apparatus of the character described comprising a base, an elongated guideway extending substantially vertically from said base, a glass heating furnace having an open ended heating chamber, means for supporting said furnace on said guideway between the opposite ends thereof, a slide member carried by said guideway and slidably movable therealong between said furnace and one end of said guideway, means on said slide member for gripping one end of and suspending an elongated glass assembly embodying a rod part disposed within a tubular part having a closed opposite end substantially in coaxial alignment with said heating chamber, means attachable to said gripped end of said assembly for evacuating gases from between said rod and tubular parts thereof, a supporting member disposed in said tubular part engaging one end of said rod part to prevent axial displacement thereof by the evacuation of said gases, means to move said slide member at a precontrolled rate along said guideway toward said furnace to feed said glass assembly progressively endwise into said heating chamber, means for heating said chamber to a temperature such as to soften said glass assembly when in said heating chamber sufficiently to permit a clad fiber to be formed and drawn from said glass assembly, movable driving means to which one end of said clad fiber may be attached and attenuated by movement of said drawing means to a predetermined length and size and means to control the rate of movement of said drawing means in accordance with the rate of movement of said slide member to produce the cross-sectional size desired of said clad fiber.

2. Apparatus of the character described comprising a base, an elongated guideway extending substantially vertically from said base, a glass heating furnace having an open ended heating chamber, means for supporting said furnace on said guideway between the opposite ends thereof, a slide member carried by said guideway and slidably movable therealong between said furnace and one end of said guideway, means on said slide member for gripping and suspending an elongated glass assembly embodying a rod part disposed within a tubular longer part having a closed end substantially in coaxial alignment with said heating chamber, one end of said rod part being placed against said closed end of said tubular part, means being attachable to the end of said assembly opposite its closed end for evacuating gases from between the rod and tubular parts of said glass assembly, a holding member contained within said tubular part and engaging the opposite end of said rod part to prevent axial displacement thereof in said tubular part by the evacuation of said gases, means for heating said chamber to a temperature such as to soften said glass assembly when in said heating chamber sufficiently to permit a clad fiber to be drawn from said glass assembly, movable means to which said fiber may be attached and drawn to a predetermined length at a controlled rate to produce the cross-sectional size desired of said fiber after said fiber is initially formed from said glass assembly and means for producing movement of said drawing means and simultaneous movement of said slide toward said furnace at cooperatively controlled rates to feed said glass assembly endwise into said heating chamber at a predetermined rate in accordance with the rate of removal of the material of said glass assembly which results from the drawing of said fiber therefrom by the movement of said means to which said fiber is attached.

3. Apparatus of the character described comprising an elongated main supporting structure, a glass heating furnace having an open ended heating chamber, means for supporting said furnace on said structure between the opposite ends thereof, a first slide member carried by said structure and slidably movable therealong between said furnace and one end of said structure, means on said first slide member for suspending an elongated glass assembly by one of its ends substantially in coaxial alignment with said heating chamber, means to move said first slide member along said main supporting structure at a precontrolled rate toward said furnace to feed said glass assembly gradually endwise into said heating chamber, means for heating said chamber to a temperature such as to soften the material of said glass assembly sufficiently to permit a fiber to be formed and drawn therefrom, a second slide member detachably mounted on said main supporting structure by a movable half section bearing portion adapted to interfit with a fixed bearing portion on said second slide member when said half section portion is secured thereto, said second slide member being slidably movable on said supporting structure between said furnace and the other end of said structure, said half section bearing portion having a part with a threaded bore portion carried thereby and adapted to interfit with a threaded bore portion on said second slide member, means on said second slide to which said fiber may be attached after it is initially formed from said glass assembly and means embodying a rotatable threaded bar to which said threaded bore portions are connected simultaneously to the assembling of said bore portions with the main supporting structure and the securing of said movable half section to said supporting structure for moving said second slide away from said furnace along said main supporting structure at a precontrolled rate in accordance with the speed of rotation of said threaded bar to draw said fiber to a desired extended length and size in accordance with said precontrolled rate of movement of said second slide and further in accordance with said precontrolled rate of movement of said first slide toward said furnace.

4. Apparatus of the character described comprising an elongated main supporting structure, a glass heating furnace having an open ended heating chamber, means for supporting said furnace on said structure between the opposite ends thereof, a first slide member carried by said structure and slidably movable therealong between said furnace and one end of said structure, means on said first slide member for suspending an elongated glass assembly by one of its ends substantially in coaxial alignment with said heating chamber, means to move said first slide member along said supporting structure to feed said glass assembly gradually endwise into said heating chamber, means of heating said chamber to a temperature such as to soften the material of said glass assembly sufficiently to permit a fiber to be formed and drawn therefrom, a second slide member detachably mounted on said main supporting structure by a movable half section bearing portion adapted to interfit with a fixed bearing portion on said second slide member when said half section portion is secured thereto, said second slide member being slidably movable on said supporting structure between said furnace and the other end of said structure, said half section bearing portion having a part with a threaded bore portion carried thereby and adapted to interfit with a threaded bore portion on said second slide member, means on said second slide to which said fiber when formed from said glass assembly may be attached, means embodying a rotatable threaded bar to which said threaded bore portions are connected simultaneously to the assembling of said bore portions with the main supporting structure and the securing of said movable half section to said supporting structure for moving said second slide away from said furnace along said main supporting structure at a predetermined rate in accordance with the speed of rotation of said threaded bar to draw out an extended length of said fiber and means by which said moving means for said first and second slides may be automatically cooperatively controlled to feed said glass assembly into said heating chamber at a predetermined rate in accordance with the rate of removal of the material of said glass assembly by the drawing of said fiber therefrom.

5. Apparatus of the character described comprising a base, an elongated guideway extending substantially vertically from said base, a glass heating furnace having an open ended heating chamber, means for supporting said furnace on said guideway between the opposite ends thereof, a slide member carried by said guideway and slidably movable therealong between said furnace and the end of said guideway opposite to said base, means on said slide member for gripping one end of and suspending an elongated glass assembly embodying a rod part disposed within a tubular part having a closed opposite end substantially in coaxial alignment with said heating chamber, means attachable to said gripped end of said assembly for evacuating gases from between said rod and tubular parts thereof, a supporting member engaging one end of said rod part to prevent axial displacement thereof by the evacuation of said gases, means to move said slide member at a precontrolled rate along said guideway toward said furnace to feed said glass assembly progressively endwise into said heating chamber, means for heating said chamber to a temperature such as to soften the material of said glass assembly when in said heating chamber sufficiently to permit a fiber to be formed and drawn therefrom, a rotatable drum-like member to which said fiber may be attached and continuously drawn by rotation of said drum-like member to a predetermined length and at a controlled rate in accordance with the cross-sectional size desired of said fiber and means by which said drum-like member may be rotated and said slide member simultaneously moved along said guideway toward said furnace each at a predetermined rate such as to control the rate of feed of said glass assembly into said heating chamber in accordance with the rate of removal of the material of said glass assembly resulting from the drawing of said fiber therefrom.

6. Apparatus of the character described comprising a base, an elongated guideway extending substantially vertically from said base, a glass heating furnace having an open ended heating chamber, means for supporting said furnace on said guideway between the opposite ends thereof, a slide member carried by said guideway and slidably movable therealong between said furnace and the end of said guideway opposite to said base, means on said slide member for gripping one end of and suspending an elongated glass assembly embodying a rod part disposed within a tubular part having a closed opposite end substantially in coaxial alignment with said heating chamber, means attachable to said gripped end of said assembly for evacuating gases from between said rod and tubular parts thereof, a supporting member engaging one end of said rod part to prevent axial displacement thereof by the evacuation of said gases, means to move said slide member at a precontrolled rate along said guideway toward said furnace to feed said glass assemby progressively endwise into said heating chamber, means for heating said chamber to a temperature such as to soften the material of said glass assembly when in said heating chamber sufficiently to permit a fiber to be formed and drawn therefrom, a rotatable drum-like member to which said fiber may be attached and continuously drawn by the winding of said fiber on said drum-like member to a predetermined length and at a controlled rate in accordance with the cross-sectional size desired of said fiber, means by which said drum-like member may be rotated and said slide member simultaneously moved along said guideway toward said furnace each at a predetermined rate such as to control the rate of feed of said glass assembly into said heating chamber in accordance with the rate of removal of the material of said glass assembly resulting from the drawing of said fiber therefrom by rotation of said drum-like member and means for simultaneously guiding said fiber laterally at a precontrolled rate across said drum-like member as it is being wound to form said fiber into a helix.

7. Apparatus of the character described comprising an elongated main supporting structure, a glass heating furnace having an open ended heating chamber, means for supporting said furnace on said structure between the opposite ends thereof, a first slide member carried by said structure and slidably movable therealong between said furnace and one end of said structure, means on said first slide member for suspending an elongated glass assembly embodying a rod part disposed within a longer tubular part having a closed end substantially in coaxial alignment with said heating chamber, means attachable to the end of said assembly opposite its closed end for evacuating gases from between the parts of said glass assembly, means extending within said tubular part between said rod part and attachable means to prevent misplacement of said rod part by the evacuation of said gases, means to move said first slide member along said supporting structure to feed said glass assembly endwise into said heating chamber, means for heating said chamber to a temperature such as to soften the material of said glass assembly when in said heating chamber sufficiently to permit a fiber to be formed and drawn therefrom, a second slide member detachably mounted on said main supporting structure and being slidably movable therealong between said furnace and the other end of said structure, means on said second slide to which said fiber may be attached after it is initially formed from said glass assembly and means for moving said second slide away from said furnace along said main supporting structure to draw out an extended length of said fiber and means by which said moving means for said first and second slides may be automatically controlled to feed said glass assembly into said heating chamber at a predetermined rate in accordance with the rate of removal of the material of said glass assembly by the drawing of said fiber therefrom.

8. The method of making a light-conducting fiber from an assembly of a rod-like part of one preselected type of glass initially freely placed to react to the action of gravity within a vertically disposed longer tubular part of a differently characterized glass having its lower end closed and the other end open comprising the steps of suspending said assembly with the closed end of said tubular part depending and with a first end of said rod-like part initially against said closed end of said tubular part, continually drawing a vacuum within said tubular part of said assembly through said open end thereof to evacuate substantially all gasses therein while providing means contained within said tubular part and engaging the opposite end of said rod-like part for holding said rod-like part against axial displacement upwardly in said tubular part by said vacuum, heating the combined glasses of said assembly to a fiber drawing viscosity throughout a controlled area thereof adjacent said depending end of said assembly, forming and drawing a fiber longitudinally endwise from the combined glasses of said assembly and progressively heating said assembly as the material of said assembly is removed endwise therefrom by the drawing of said fiber.

9. The method of making a light-conducting fiber from an assembly of a rod-like part of one preselected type of glass placed within a longer tubular part of a differently characterized glass having one of its ends closed and the other end open comprising the steps of suspending said assembly with the closed end of said tubular part depending and with one end of said rod-like part initially positioned against said closed end of said tubular part, continually drawing a vacuum within said tubular part of said assembly through said open end thereof to evacuate substantially all gases therein while providing means contained within said tubular part and engaging the opposite end of said rod-like part for holding said rod-like part against axial displacement in said tubular part by said vacuum, heating the combined glasses of said assembly to a fiber drawing viscosity throughout a controlled area thereof adjacent said depending end of said assembly and drawing the glasses of said assembly together from said depending end of said assembly to produce a fiber having a core part formed from said rod-like part and an integral surrounding cladding formed from said tubular part.

10. The method of making light-conducting fibers from an assembly of a rod-like part of one preselected type of glass placed within a tubular part of a differently characterized glass having one of its ends closed and the other end open comprising the steps of suspending said assembly with the closed end of said tubular part depending and with one end of said rod-like part initially positioned against said closed end of said tubular part, continually drawing a vacuum within said tubular part of said assembly through said open end thereof to evacuate substantially all gases therein while holding said rod-like part against displacement by said vacuum, heating the combined glasses of said assembly to a fiber drawing viscosity throughout a controlled area thereof adjacent said depending end of said assembly, forming a fiber by drawing said assembly substantially longitudinally from said heated end thereof, gripping said fiber adjacent its terminal end and continuing to draw the same to a predetermined length, severing said fiber from said glass assembly adjacent the heated end of said assembly and repeating said fiber drawing and severing steps a number of times sufficient to exhaust the major portion of the glasses of said assembly.

11. The method of making a light-conducting fiber from an assembly of a rod-like part of one preselected type of glass placed within a longer tubular part of a differently characterized glass having one of its ends closed and the other end open comprising the steps of suspending said assembly with the closed end of said tubular part depending and with one end of said rod-like part initially positioned against said closed end of said tubular part, continually drawing a vacuum within said tubular part of said assembly through said open end thereof to evacuate substantially all gases therein while providing supporting means contained within said tubular part and engaging the opposite end of said rod-like part for holding said rod-like part against axial displacement in said tubular part by said vacuum, heating the combined glasses of said assembly to a fiber drawing viscosity throughout a controlled area thereof adjacent said depending end of said assembly, forming a fiber by drawing said assembly substantially longitudinally from said heated end thereof, gripping said fiber adjacent its terminal end and drawing the same continuously from said assembly until the major portion of the glasses of said assembly are exhausted.

12. The method of making a light-conducting device from an assembly of a rod-like part of one preselected type of glass placed normally to react to the action of gravity within a vertically disposed tubular part of a differently characterized glass having its lower ends initially closed and its other end normally open comprising the step of suspending said assembly with the closed end of said tubular part depending and with the lower end of said rod-like part initially positioned against said closed end of said tubular part, continually drawing a vacuum within said tubular part of said assembly through said open end thereof to evacuate substantially all gases therein while holding said rod-like part against displacement by said vacuum, heating the combined glasses of said assembly to a drawing viscosity throughout a controlled area thereof adjacent said depending end of said assembly and drawing the glasses of said assembly together from said depending end to a given reduced cross-sectional size having a core part formed of said rod-like part and an integral surrounding cladding formed of said tubular part.

References Cited in the file of this patent

UNITED STATES PATENTS

| | | |
|---|---|---|
| 946,179 | Weiskopf | Jan. 11, 1910 |
| 1,344,325 | Westbury | June 22, 1920 |
| 1,857,791 | Peiler | May 10, 1932 |
| 2,313,296 | Lamesch | Mar. 9, 1943 |
| 2,471,752 | Ingmanson | May 31, 1949 |
| 2,631,356 | Sparks et al. | Mar. 17, 1953 |
| 2,825,260 | O'Brien | Mar. 4, 1958 |

FOREIGN PATENTS

| | | |
|---|---|---|
| 540,096 | Germany | Dec. 9, 1931 |
| 520,564 | Italy | February 1957 |
| 239,719 | Switzerland | Feb. 18, 1946 |